July 19, 1955 — J. K. RUSSELL — 2,713,423
FILTER ELEMENT
Filed April 28, 1952
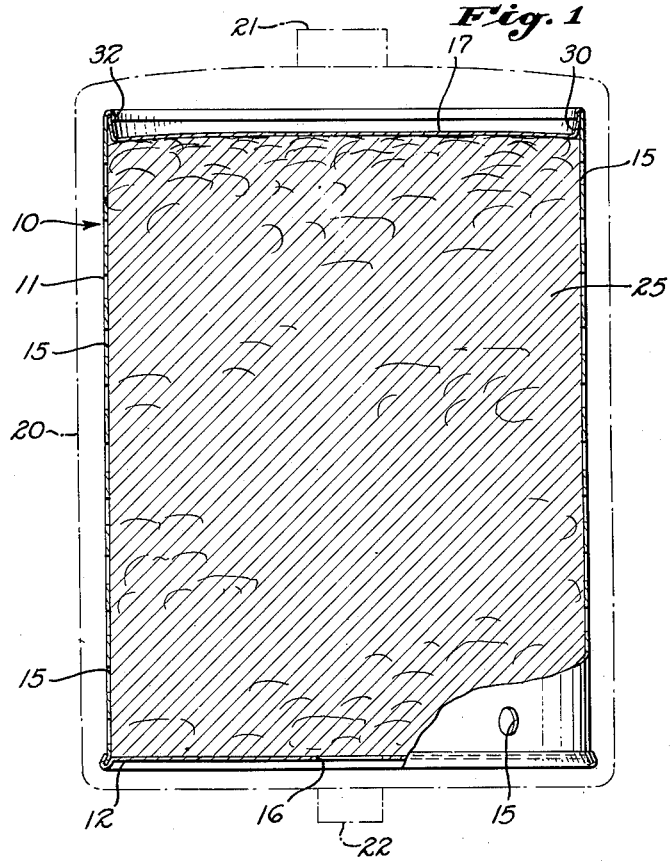
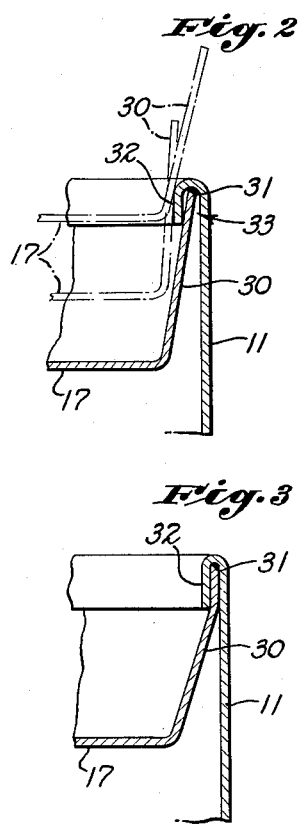
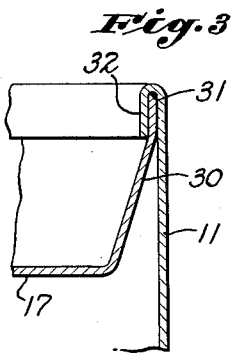
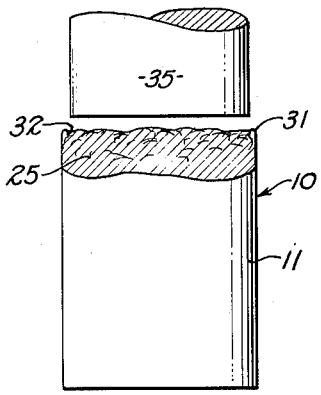
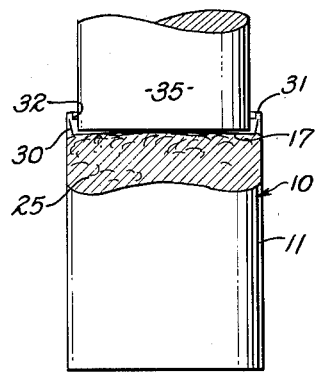
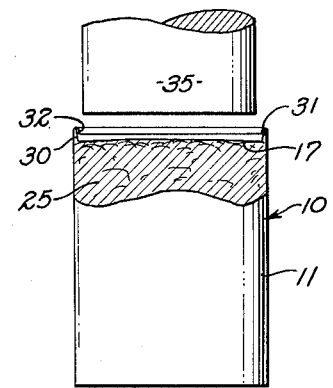
INVENTOR:
JOHN K. RUSSELL
BY HIS ATTORNEYS
HARRIS, KIECH, FOSTER & HARRIS

United States Patent Office 2,713,423
Patented July 19, 1955

2,713,423
FILTER ELEMENT

John K. Russell, North Hollywood, Calif., assignor to Luber-Finer Incorporated, Los Angeles, Calif., a corporation of California Application April 28, 1952, Serial No. 284,799

2 Claims. (Cl. 210—148)

This invention relates to filter elements and to a method of fabricating such filter elements. For the purpose of disclosure and to illustrate the principles involved, the invention will be described as embodied in a filter element or replaceable filter cartridge for an oil filter in the lubrication system of an internal combustion engine. The invention has special utility for this purpose and such a disclosure will provide adequate guidance for those skilled in the art who may have occasion to apply the invention to other specific purposes.

A filter element or replaceable cartridge of the present type is used inside a filter housing having an inlet and an outlet for the circulation of lubricant therethrough. The fluid to be filtered, which in this instance is liquid in the form of oil, circulates under pressure and entering the cylindrical filter element through the peripheral wall of the element flows more or less radially inward toward the central region of the element and then flows axially to an outlet port in one end of the element. The element in this instance is a container made of sheet material having a perforated cylindrical shell and a bottom opening to serve as an outlet. A mass or body of suitable filter material is packed firmly into the container around the perforated tube, which material usually comprises at least in part fibrous material such as cotton, sawdust, paper, etc. The filter body may also contain non-fibrous material such as fuller's earth. In all instances, the filter body has a certain amount of resiliency, which fact is used to advantage in the preferred practices of the present invention.

The general object of the invention is to provide an efficient and inexpensive method of fabricating such a filter element. A more specific object of the invention is to provide a fabrication procedure that will insure a predetermined internal pressure exerted by the filter mass in the completed filter element. Another specific object is to provide an exceedingly simple method of closing the filter element, which method may be performed by applying a cover to the shell of the filter element, the shell being filled with the filter material, and the cover being applied under pressure to compress the filter material.

An important feature of the invention is the concept of utilizing the elasticity or resiliency of the filter material in the fabrication procedure and of relying upon such resiliency for holding the cover in place in the finished filter element. The invention is further characterized by the concept of using the cover in the manner of a ram for final compression of the filter material in assembling the element and of employing a construction in which after assembly the cover may serve as a piston or movable wall to shift inward under the compulsion of external fluid pressure whenever the volume of the filter mass contracts during operation of the filter element.

These objects and features are provided by a construction in which the shell of the filter element has an internal shoulder at or near its rim or open end to engage and retain the cover. The cover is inserted under pressure into the open end of the shell and has a resilient peripheral structure which contracts to pass the shoulder of the shell and upon passing the shoulder expands for engagement with the shoulder, the shoulder thereafter serving as a stop to limit outward movement of the assembled cover.

Preferably the cover is made of sheet metal or other suitable sheet material and is formed with a flared peripheral flange, the base portion of the flange being less than the restricted diameter of the shell in the region of the inward shoulder and the edge portion of the flange having an unrestrained diameter greater than the restricted diameter. In the preferred practice of the invention, the unrestrained maximum diameter of the flared flange is not only greater than the restricted diameter of the shell but is also greater than the diameter of the inner circumferential wall of the shell. By virtue of such a resilient construction, the contracted cover maintains pressure contact with the inner circumferential wall of the shell. Since the peripheral flange is flared outward, external fluid pressure acting on the flange also tends to press the flange into contact with the surrounding shell and thus the resiliency of the flange is reinforced by the reaction of the flange to fluid pressure in maintaining close contact between the periphery of the cover and the surrounding inner circumferential wall of the shell.

Since the flared flange of the cover extends outward, it is apparent that the distance by which the end wall formed by the cover is set inward from the rim of the shell may be governed by varying the dimension of the peripheral flange of the cover. As will be explained, a feature of the preferred practice of the invention is that this distance is related to the resiliency of the selected filter material.

The various objects, features and advantages of the invention may be readily understood from the following detailed description considered with the accompanying drawing.

In the drawing, which is to be regarded as merely illustrative:

Fig. 1 is a view partly in side elevation and partly in section showing a preferred embodiment of the filter element;

Fig. 2 is an enlarged fragmentary section showing the relation of the cover to the shell of the filter element at successive stages in the fabrication procedure:

Fig. 3 is a similar sectional fragmentary view showing how the rim flange of the shell may be deformed or pinched into engagement with the peripheral flange of the shell if desired; and Figs. 4 to 6 are diagrammatic views partly in side elevation and partly in section illustrating steps in the preferred fabrication procedure.

The drawing shows a filter element or replaceable cartridge generally designated 10 which is a preferred embodiment of the invention. The filter element 10 is in the form of a cylindrical container made of suitable sheet material, for example, sheet metal, and includes a cylindrical shell 11 with a bottom wall 12 united therewith. The shell 11 has numerous perforations 15 to serve as inlets and the bottom wall 12 has an outlet opening 16. Any suitable means may be used to hold the confined filter material back from the outlet opening. The open end of the shell 11 is closed by a cover 17 in a manner that will be described. In accord with well-known practice, the filter element 10 is intended to be submerged in fluid confined under pressure in a suitable filter housing 20, shown in broken lines, which housing has an upper inlet port 21 and a lower outlet port 22.

The filter element 10 contains a mass or body of suitable filter material 25 which is usually largely fibrous in character and may include fuller's earth and other non-fibrous material. Various fibrous materials may be used, including sawdust, cotton, paper, and the like. For the purpose of the present disclosure, the filter material selected by way of example is paper, the annular space in the filter element 10 around the perforated tube 15 being filled with wads of newsprint under substantial pressure.

In the contemplated use of the filter element, the fluid which enters the inlet port 21 of the filter housing 20 is forced to flow into the filter element through the perforations 15 in shell 11 and then flows through the tortuous passages provided by the filter material 25 to reach the outlet port 22. It is apparent that the operating pressure prevailing at the outlet port 22 will be substantially below the pressure of the fluid entering the inlet port 21 and that the whole filter element will be subject to substantial external pressure by reason of this pressure differential.

The present invention has particular reference to the arrangement for retaining the cover 17 in its assembled position closing the top of the filter element 10 around the perforated tube 15. For this purpose it is contemplated that the cover 17 will be formed with an outwardly directed flared peripheral flange 30 and that the cylindrical shell 11 of the filter element will be formed with a suitable inner shoulder 31 to serve as a stop for engagement by the peripheral flange 30. In the preferred practice of the invention, it is further contemplated that while the cover 17 will normally retain the filter material 25 under substantial pressure and therefore will normally be held at its outermost limit position by the filter material, nevertheless, the cover will be free to move inward to follow any contraction that may occur in the volume of the filter material in the course of filtering operation. Thus, the filter mass 25 will brace or support the cover 17 against external pressure and will likewise support the perforated shell 11 and the bottom wall 12 so that the whole of the filter element may be made of relatively light construction.

In the preferred practice of the invention, an inner shoulder 31 (Fig. 2) to serve as a stop for the flared cover flange 30 is provided by an inwardly turned flange 32 formed on the rim of the cylindrical shell 11, the flange being curved inward toward the bottom wall 12 of the filter element to form a downwardly directed annular recess 33 of which the inner shoulder 31 is the uppermost part. As may be seen in Fig. 2, the minimum diameter of the flared cover flange 30, that is to say, the outside diameter at the base of the flared flange, is less than the inside diameter of the inwardly turned rim flange 32. Thus, the base of the flared cover flange 30 will easily pass through the restriction formed by the rim flange 32 of the shell and by virtue of the resiliency of the material, the flared cover flange will contract or flex inward to pass the rim flange 32. While the yielding action of the material that permits the flared cover flange to pass the rim flange occurs largely and primarily in the flared flange of the cover, a certain amount of yielding action also occurs in the rim flange of the cylindrical shell.

In the preferred practice of the invention, it is further contemplated that the unrestrained maximum diameter of the flared cover flange 30, that is to say, the diameter before the cover is inserted in the cylindrical shell, will be greater than the inside diameter of the inner cylindrical surface of the shell so that after the cover is moved inward past the rim flange 32, the flared flange 30 will continually press radially outward. Thus, the cover will maintain close contact with the cylindrical shell 11 in the event the cover shifts downward away from the inner shoulder 31 to follow any contraction that may occur in the volume of the filter mass 25. The unrestrained configuration of the cover 17 is shown at the uppermost dotted position of the cover in Fig. 2 and it may be seen that the diameter of the outer edge of the flared flange 30 is slightly greater than the diameter of the inner cylindrical surface of the cylindrical shell 11. It will be readily appreciated also that external fluid pressure acting on the flared flange 30 will also tend to expand the flange into intimate contact with the surrounding cylindrical surfaces of the shell 11.

Broadly described, the contemplated method of assembling the filter element 10 consists in packing a suitable quantity of the filter material 25 into the open cylindrical shell 11 and then forcing the cover 17 inward against the filter material until the flared flange 30 of the cover slips past the rim flange 32. Then the cover is released to be forced upward by the compressed filter material into contact with the inner shoulder 31 of the cylindrical shell 11. Thus, the contemplated method takes advantage of the inherent resiliency of the filter material.

For the purpose of carrying out this procedure, a suitable pressure-actuated device may be employed such as a hydraulic ram 35 of cylindrical configuration to clear the perforated tube 15 of the filter element. The first step in the assembly procedure is to pack the required quantity of material into the open cylindrical shell 11, the required quantity being such that the filter material will exert the required upward pressure against the cover 17 in the finished filter element. In some instances, the hydraulic ram 35 may be found useful for packing or tamping the filter material. Thus, it may be desirable to fill the cylindrical shell 11 with an initial quantity of filter material, use the ram 35 to tamp the initial quantity to a compact volume and repeat the steps of adding filter material and tamping the filter material until a final quantity of tamped filter material fills the open shell of the container to approximately the level of the shell rim as shown in Fig. 4.

The cover 17 is then placed on top of the filter material at the level shown in Fig. 4 and the ram is moved downward against the cover as shown in Fig. 5 to force the cover inward past the rim flange 32 of the shell 11. The flared cover flange 30 moves through the sequence of positions shown in dotted lines in Fig. 2 and upon passing beyond the rim flange 32 snaps outward against the surrounding inner circumferential surface of the shell 11 as shown in Fig. 5. The ram is then retracted to permit the resilient filter material to force the cover upward into the final position shown in Fig. 6, and in full lines in Fig. 2.

The final quantity of filter material 25 that is packed into the container exerts a predetermined pressure when compressed to the final volume shown in Figs. 1 and 6. An advantage of using a hydraulic ram is that the pressure exerted by the ram may be adjusted to the desired pressure and just enought of the filter material may be placed in the container to cause the ram acting with the adjusted pressure to come to rest at the level the cover 17 is to take in the finished filter element. Thus, the level at which the ram comes to rest against the filter material under the set pressure becomes a test of whether or not enough material has been packed in the container.

The relation of the depth of the flared cover flange 30 to the resiliency of the filter material 25 now becomes apparent. In general, the depth of the cylindrical shell 11 must be sufficient to contain the filter material in the unrestrained state shown in Fig. 4 and at the final position of the cover 17 the flared cover flange 30 must be deep enough to correspond to the contraction of the unrestrained filter material necessary to provide the final outward pressure of the predetermined magnitude against the cover 17. It is also apparent that the elastic range of the tamped filter material 25 must be sufficient to permit the cover to be moved inward as shown in Fig. 5 to contract the mass of filter material to less than the final volume, the material having sufficient elasticity to recover from this maximum compression and force the cover upward. If, for example, the final total pressure to be exerted by filter material against the cover corresponds to 300 lbs. pressure, a somewhat higher ram pressure will be necessary to force the cover inward past the rim flange as shown in Fig. 5.

If desired, the rim flange 32 may be compressed or rolled down to embrace the edge portion of the flared cover flange 30 as shown in Fig. 3. It is usually preferable, however, to omit this step not only because it is unnecessary with respect to retention of the cover but also because it is desirable to leave the cover free to slide downward into the interior of the container if the mass of filter material subsequently contracts in the course of operation. As heretofore pointed out, the flared cover flange 30 will follow the cylindrical wall of the shell.

My specific description of a preferred practice of the invention will suggest to those skilled in the art various changes, substitutions and other departures from my disclosure that properly lie within the spirit and scope of the appended claims.

I claim as my invention:

1. A filter element of the character described for use submerged in liquid under pressure with the liquid flowing peripherally into and axially out of the element, said element comprising: a perforated cylindrical shell having a wall closing one end thereof, the other end of the shell being formed with an inner circumferential shoulder having a recess directed towards said wall; a closure for said other end of the shell in the form of a circular member of sheet material slidingly mounted in said shell below said shoulder for axial movement relative to said shell, said cover having an outwardly directed resilient peripheral flange for engagement with said shoulder to limit outward movement of the cover, the unrestrained diameter of the edge of said flange being greater than the inside diameter of said shell whereby said edge presses into close contact with the shell when the cover shifts inward from said shoulder, said flange being flared whereby external fluid pressure tends to spread the flange into contact with the shell; and a mass of filter material in said shell in contact with said cover to oppose inward movement of the cover whereby the volume of said mass under pressure from said liquid fixes the position of said cover and said cover shifts in accord with any contraction of the mass whereby the mass continually reinforces said cover to prevent buckling of the cover under external fluid pressure.

2. A filter element as set forth in claim 1 in which said cover is imperforate and said shell is made of sheet metal.

References Cited in the file of this patent

UNITED STATES PATENTS

| | | |
|---|---|---|
| 904,763 | Dorman | Nov. 24, 1908 |
| 1,930,625 | Schurman | Oct. 17, 1933 |
| 2,110,009 | Wiedenbacker | Mar. 1, 1938 |
| 2,559,133 | Schultz | July 3, 1951 |
| 2,584,771 | Wilkinson | Feb. 5, 1952 |
| 2,614,694 | Sather | Oct. 21, 1952 |